(12) United States Patent
Itoh et al.

(10) Patent No.: US 8,684,169 B2
(45) Date of Patent: Apr. 1, 2014

(54) TRANSFER DEVICE

(75) Inventors: Kazuo Itoh, Kasai (JP); Tatsuhiko Nakamura, Hyogo (JP); Masaki Tanaka, Himeji (JP); Makoto Mitsuyoshi, Kakogawa (JP); Toshiyuki Tachibana, Himeji (JP); Michiyuki Yamanaka, Kasai (JP)

(73) Assignee: Itoh Denki Co., Ltd. (JP)

( * ) Notice: Subject to any disclaimer, the term of this patent is extended or adjusted under 35 U.S.C. 154(b) by 295 days.

(21) Appl. No.: 13/210,482

(22) Filed: Aug. 16, 2011

(65) Prior Publication Data

US 2012/0048678 A1 Mar. 1, 2012

(30) Foreign Application Priority Data

Aug. 31, 2010 (JP) ................................. 2010-195017
Aug. 31, 2010 (JP) ................................. 2010-195018

(51) Int. Cl.
  *B65G 37/00* (2006.01)
  *B65G 47/46* (2006.01)
(52) U.S. Cl.
  USPC ................. 198/597; 198/370.06; 198/457.01; 198/809
(58) Field of Classification Search
  USPC .......... 198/370.06, 413, 416, 457.01, 457.02, 198/457.03, 463.3, 597, 605, 809
  See application file for complete search history.

(56) References Cited

U.S. PATENT DOCUMENTS

| | | | |
|---|---|---|---|
| 3,086,640 A * | 4/1963 | Verrinder ...................... | 198/401 |
| 3,456,773 A * | 7/1969 | Titmas, Jr. ............... | 198/370.09 |
| 3,621,973 A * | 11/1971 | Carlson et al. ................ | 198/456 |
| 4,273,239 A * | 6/1981 | Thwaites et al. .......... | 198/781.06 |
| 4,488,638 A * | 12/1984 | Morgan et al. ........... | 198/781.06 |
| 4,730,718 A * | 3/1988 | Fazio et al. ................. | 198/370.1 |
| 4,926,999 A * | 5/1990 | Fauth et al. .................... | 198/358 |
| 4,962,841 A * | 10/1990 | Kloosterhouse ......... | 198/370.09 |
| 5,205,394 A * | 4/1993 | Zeuschner ................. | 198/370.1 |
| 5,213,189 A * | 5/1993 | Agnoff ......................... | 193/35 A |
| 5,743,375 A * | 4/1998 | Shyr et al. .................. | 198/463.3 |
| 6,216,847 B1 * | 4/2001 | Schmidt ..................... | 198/463.3 |
| 6,343,685 B1 * | 2/2002 | Hofer ....................... | 198/370.09 |
| 6,505,733 B2 * | 1/2003 | Troupos et al. ............... | 198/809 |
| 6,644,459 B2 * | 11/2003 | van Leeuwen et al. ..... | 198/370.1 |
| 6,820,736 B2 * | 11/2004 | Itoh et al. .................. | 198/781.01 |
| 7,114,608 B2 * | 10/2006 | Brown et al. .............. | 198/370.1 |
| 7,681,710 B2 * | 3/2010 | Kuhn et al. ............... | 198/370.06 |

FOREIGN PATENT DOCUMENTS

JP 2005-280857 10/2005

* cited by examiner

*Primary Examiner* — Douglas Hess
(74) *Attorney, Agent, or Firm* — Wood, Phillips, Katz, Clark & Mortimer

(57) ABSTRACT

A transfer device including a main conveyor part having a first conveying surface and a subsidiary conveyor part having a second conveying surface and arranged at the same area as the main conveyor part, the main conveyor part being designed to convey an article placed on the first conveying surface in one conveying direction, the subsidiary conveyor part being designed to convey an article placed on the second conveying surface in another direction transverse to the conveying direction of the main conveyor part, the main conveyor part and/or the subsidiary conveyor part being a roller conveyor having rollers, at least one of the rollers being a braking roller equipped with a brake, and the brake being designed to prevent the article from proceeding at least to the direction transverse to the conveying direction of the roller conveyor by a frictional force acting between the article and the braking roller.

20 Claims, 14 Drawing Sheets

TRANSFER DEVICE

TECHNICAL FIELD

The present invention relates to a transfer device disposed in a conveyor line and designed to set a conveying direction of articles to both a longitudinal direction and a transverse direction.

BACKGROUND ART

Conveyor lines are often used to convey articles in facilities such as an assembly line of products and a delivery center. In a delivery center, for example, a number of conveyor lines are arranged in matrix with transfer devices disposed at positions where the conveyor lines intersect. Operations of the transfer devices transfer articles from a conveyor line to another conveyor line, so that the articles are conveyed to a desired destination.

Generally, such a transfer device includes a conveyor part for conveying articles in a longitudinal direction, another conveyor part for conveying articles in a transverse direction, and a lifting part. Normally, a top face of a conveyor part unrelated to conveyance in the longitudinal direction or in the transverse direction of the transfer device is kept below a conveying surface of the conveyor line so as to get out of the way of conveyance of the article conveyed on the conveyor line. When an article moving on the conveyor line is determined to head for a predetermined destination by a sensor or the like, the article is stopped on the transfer device by a stopper. Then, a top face of a conveyor part related to the conveyance is lifted above the conveying surface of the conveyor line by an operation of the lifting part, thereby lifting up the article. Thereafter, the conveyor part is operated so as to transfer the article to another conveyor. Such a transfer device is disclosed in Patent Document 1.

PATENT DOCUMENT

Patent Document 1: JP 2005-280857 A

DISCLOSURE OF INVENTION

Technical Problem

Recently, in some facilities such as a delivery center, there is a desire to increase the speed of conveyance of articles on conveyor lines in view of efficiency. However, the increased speed of conveyance of articles on conveyor lines employing the transfer device disclosed in Patent Document 1 might cause the articles or conveying members such as a tray to collide against the stopper at a high speed and to be damaged when the article is stopped on the transfer device. Additionally, in this case, there is a problem such that the stopper is subjected to an extreme shock, resulting in untimely wear and tear of the stopper.

Patent Document 1 also discloses a method of stopping an article on the transfer device by putting a brake on conveyor rollers in the transfer device. However, this method has such a problem that a long braking distance is needed for stopping the article if conveyance of articles is increased in speed. Specifically, the article having been carried into the conveyor rollers at a high speed glides on outer peripheral surfaces of the conveyor rollers even if the conveyor rollers are unrotatable, resulting in requiring a long distance to completely stop the article. Consequently, it is necessary to form the transfer device longer in a carry-in direction of an article, and thus, the transfer device reluctantly grows in size.

There is also a method of controlling the conveyor rollers located upstream in the conveying direction of the transfer device so as to limit the speed of the article carried in the transfer device. However, this method has such a problem that conveyance control of articles on the conveyor line may become complicated.

Taking account of the above-mentioned problems of the known art, an object of the present invention therefore is to provide a transfer device protecting articles and peripheral members from damage and excess wear and tear when the articles are stopped on the transfer device, without the need to grow the transfer device in size and without the need of complicated conveyance control for putting a brake on the articles, even when the transfer device is employed in a conveyor line carrying articles at a high speed.

Solution to Problem

An aspect of the present invention proposed herein to solve the above-mentioned problem is a transfer device including a main conveyor part having a first conveying surface and a subsidiary conveyor part having a second conveying surface and arranged at the same area as the main conveyor part, the main conveyor part being designed to convey an article placed on the first conveying surface in one conveying direction, the subsidiary conveyor part being designed to convey an article placed on the second conveying surface in another direction transverse to the conveying direction of the main conveyor part, at least one selected from a group consisting of the main conveyor part and the subsidiary conveyor part being a roller conveyor having rollers, at least one of the rollers being a braking roller equipped with a brake, and the brake being designed to prevent the article from proceeding at least to the direction transverse to the conveying direction of the roller conveyor by a braking force acting between the article and the braking roller.

The braking force is preferably generated by a frictional force.

"The direction transverse to the conveying direction of the roller conveyor" denotes a direction containing a component along an axial direction of the roller conveyor, hereinafter referred to as "the transverse direction".

In the transfer device in the present aspect, either one of the main conveyor part and the subsidiary conveyor part is the roller conveyor provided with the braking roller. The braking roller has a function of preventing an article from proceeding at least to the transverse direction by the braking force acting between the article and the braking roller.

When the article has been carried in the transfer device and is to proceed to the transverse direction, a large braking force acts between the article and the braking roller, thereby decelerating or stopping the article. In other words, the braking roller in the transfer device in this aspect decelerates or stops the article simply by the article on the braking roller trying to proceed to the transverse direction. Therefore, the transfer device provided with the braking roller in the present invention decelerates or stops an article having been carried in the transfer device, requiring no complicated control or the like. Consequently, when the transfer device changes a direction of a conveyed article so as to transfer the article out using the roller conveyor, the article is easily decelerated or stopped, and thus conveyance of the article is simply performed.

By the transfer device in the art, a surface of a roller conveyor is made of metal, so that, when an article has proceeded in an axial direction of rollers, to the article slips in the axial direction on the rollers, resulting in being difficult to stop. On the contrary, in the transfer device in this aspect, employment of the braking roller utilizing a frictional force, for example, an outer peripheral surface of the braking roller has a high frictional coefficient, thereby preventing the article from moving with sliding in the axial direction on the outer peripheral surface of the rollers like the normal roller conveyor. Consequently, compared with employment of a normal roller conveyor, the article is stopped at a short distance. That dispenses with a distance kept for braking of an article in the transfer device, thereby downsizing the transfer device.

The article herein includes not only an object to be conveyed but also member for conveyance such as a tray.

It is preferable that the braking roller has a thrust direction being the same or substantially the same as a direction of the article being carried in the roller conveyor.

This configuration quickly transfers an article having been carried in the transfer device to a direction transverse (for example, perpendicular) to a carry-in direction of the article. Specifically, the article having been carried in the roller conveyor proceeds from an end part in the thrust direction of the braking roller onto the braking roller and tries to proceed on the braking roller along the thrust direction of the braking roller. At this moment, the article is decelerated as proceeding to the thrust direction on the braking roller. Additional rotation drive of the roller conveyor when the article is carried in the roller conveyor performs deceleration of the article in the thrust direction and simultaneously conveyance of the article by the roller conveyor. In other words, the article is conveyed by the roller conveyor while decelerated in the direction perpendicular to the conveying direction or in the thrust direction. Unlike the conventional conveyance of the article by the roller conveyor after stopping of the article, stopping of the article and conveyance of the article by the roller conveyor are simultaneously performed, so that the article is conveyed at a high speed when the transfer device changes a conveying direction of the article so as to transfer the article out using the roller conveyor.

Herein, "the thrust direction" denotes a direction along a rotation axis of rollers.

The braking roller includes one formed by a roller body covered with a high-frictional member having a high frictional coefficient as an example.

Alternatively, the braking roller formed with at least one selected from a group consisting of concavity and convexity on its outer peripheral surface is also recommended. The braking roller may be also formed by a roller body covered with a high-frictional member having a high frictional coefficient, the high-frictional member being further formed with at least one selected from a group consisting of concavity and convexity on a surface thereof.

The braking roller may be also formed by a roller body covered with either rubber or resin.

By these configurations, it is possible to easily and inexpensively form the braking roller having an outer surface with a high frictional coefficient.

Preferably, the transfer device further includes a lift for lifting up and down at least one selected from the group consisting of the main conveyor part and the subsidiary conveyor part.

It is preferable that the transfer device forms a part of a conveyor, so as to convey the article to a direction along a main conveying path of the conveyor by the main conveyor part in the transfer device, the subsidiary conveyor part being composed of the roller conveyor and including the braking roller, and that, when the subsidiary conveyor part is to make the article to diverge from the main conveying path, the braking roller is moved to a level where an outer peripheral surface of the roller is higher than the first conveying surface of the main conveyor part before the article has reached the transfer device.

By this configuration, when the article starts to be carried in the transfer device, the conveying surface formed by the braking roller or the conveying surface formed by a plurality of members including the braking roller has been already formed. Therefore, immediately after having been carried in the transfer device, the article is brought into contact with the braking roller. That means, it is possible to early start deceleration of the article until the article has been carried in the transfer device and transferred to a predetermined direction from the transfer device. Consequently, the article having been carried in the transfer device at a high speed is significantly decelerated.

Herein, "the conveying surface" denotes a surface with which the article has contact at its bottom face on the transfer device when the transfer device transfers the article. The braking roller may be fixed at a predetermined level, but may descend (escape) when the article is not placed on.

The subsidiary conveyor part may be actuated after the article has substantially stopped with respect to a direction along the main conveying path so as to add a force in a direction transverse to the direction along the main conveying path onto the article, so that the article diverges from the main conveying path.

It is possible that the transfer device forms a part of a conveyor, so as to convey the article to a direction along a main conveying path of the conveyor by the main conveyor part in the transfer device, the subsidiary conveyor part being composed of the roller conveyor and including the braking roller, and that, when the article to diverge from the main conveying path of the conveyor has approached or reached the transfer device, the second conveying surface of the subsidiary conveyor part is moved to a level higher than that of the first conveying surface of the main conveyor part.

It is also possible that the subsidiary conveyor part is actuated while the article is moving to the direction along the main conveying path through inertia so as to add a force onto the article in a direction transverse to the inertia, so that the article diverges from the main conveying path.

By the transfer device in this aspect, the subsidiary conveyor part starts conveyance of the proceeding article while the article is moving to the direction along the main conveying path, thereby changing the conveying direction of the article without stopping of the article on the transfer device. Besides, only actuation of the subsidiary conveyor part changes the conveying direction of the article to the direction transverse to the main conveying path from the main conveying path. Therefore, compared with a method of changing of the conveying direction of the article by actuation of a pushing member such as a pusher, the conveying direction of the article is changed in a short period of time. Further, unlike a method of pushing of a side of the article with the pushing member, the article is kept in posture after changing of the conveying direction. Additionally, compared with the method described above, this aspect dispenses with a pushing member, thereby reducing the number of members, since the conveying direction is changed by a force generated by the subsidiary conveyor part.

The lift preferably includes a horizontally-moving member designed to perform a horizontal movement and a switch designed to switch the horizontal movement to a lifting movement.

The lift further preferably includes a switching roller provided with a motor and an output member designed to be rotated by the motor, so that the horizontally-moving member moves horizontally upon power transmission from the output member of the switching roller.

The lift is preferably positioned outside the main conveyor part and the subsidiary conveyor part.

In a case where the lift includes the horizontally-moving member designed to perform a horizontal movement and a switch designed to switch the horizontal movement to a lifting movement, at least one selected from the group consisting of the main conveyor part and the subsidiary conveyor part is lifted up and down by making the horizontally-moving member to move horizontally. There is no need to prepare a wide space in a height direction in arrangement of the lift because the horizontally-moving member does not move vertically.

Further, in a case where the lift is arranged outside the main conveyor part and the subsidiary conveyor part, the transfer device is reduced in height unlike arrangement of the lift below the main conveyor part or the subsidiary conveyor part.

The switch described above may be configured by a mechanism such as a cam mechanism, a crank mechanism, and various link mechanisms.

Preferably, the main conveyor part is formed by at least one rotation member with a linear member spanned around and a support for supporting the rotation member and the linear member and the subsidiary conveyor part is a roller conveyor formed by a plurality of rollers including the at least one braking roller and a frame for supporting the rollers, wherein the linear member is partly or entirely arranged between the rollers of the roller conveyor.

The lift preferably has a support lifting portion for switching the horizontal movement of the horizontally-moving member to the lifting movement so as to lift up and down the support.

The lift preferably has a frame lifting portion for switching the horizontal movement of the horizontally-moving member to the lifting movement so as to lift up and down the frame.

Preferably, the transfer device is designed to alternately lift up and down the frame and the support in accordance with the horizontal movement of the horizontally-moving member.

Preferably, the transfer device further includes a conveyance preventer for preventing the article from proceeding.

By this configuration, the article is stopped not only by the brake of the braking roller but also by the conveyance preventer, so as to be certainly prevented from proceeding to an unanticipated direction. Besides, the article is stopped by the conveyance preventer after having been decelerated by the brake of the braking roller, so as to be prevented from colliding with the conveyance preventer at a high speed. That avoids excess wear and tear of the conveyance preventer and damage to the article and the like.

It is recommended to have such a specific configuration that a transfer device includes a main conveyor part having a first conveying surface, a subsidiary conveyor part having a second conveying surface and arranged at the same area as the main conveyor part, a conveyance preventer for preventing the article from proceeding, and a lift for lifting up and down the main conveyor part and the subsidiary conveyor part, the main conveyor part being designed to convey an article placed on the first conveying surface in one conveying direction, the subsidiary conveyor part being designed to convey an article placed on the second conveying surface in another direction transverse to the conveying direction of the main conveyor part, wherein the main conveyor part is formed by at least one rotation member with a linear member spanned around and a support for supporting the rotation member and the linear member, wherein the subsidiary conveyor part is a roller conveyor formed by a plurality of rollers and a frame for supporting the rollers, the rollers including at least one roller covered with either rubber or resin, and wherein the lift includes a horizontally-moving member designed to perform a horizontal movement, and the transfer device further includes a support lifting portion for switching the horizontal movement of the horizontally-moving member to the lifting movement so as to lift up and down the support, a frame lifting portion for switching the horizontal movement of the horizontally-moving member to the lifting movement so as to lift up and down the frame, and a conveyance preventer-lifting portion for switching the horizontal movement of the horizontally-moving member to the lifting movement so as to lift up and down the conveyance preventer, so as to alternately lift up and down the frame and the support in accordance with the horizontal movement of the horizontally-moving member, and simultaneously to lift up the conveyance preventer when one selected from a group consisting of the frame and the support is lifted up and to lift down the conveyance preventer when the other selected from the group is lifted up.

By this configuration, the main conveyor part is formed by the linear member and the subsidiary conveyor part is formed by the roller conveyor, with the linear member partly or entirely arranged between the rollers of the roller conveyor. The conveyance preventer is attached so as to be lifted up and down, being at a lower level than the conveying surface of the main or subsidiary conveyor part during descending and partly or entirely at a higher level than the conveying surface during ascending. Shortly, the main conveyor part, the subsidiary conveyor part, and the conveyance preventer are arranged so as to overlap, and thus the transfer device is downsized.

Further, by this configuration, the frame and the support are alternately lifted up and down in accordance with the horizontal movement of the horizontally-moving member, and simultaneously conveyance preventer is lifted up when either one of the frame and the support is lifted up. Shortly, the horizontal movement of the horizontally-moving member lifts up and down the main conveyor part, the subsidiary conveyor part, and the conveyance preventer at all once. That enables downsizing of the lift unlike a method of discretely providing lifts on these members, thereby requiring no wide space for the lift. Therefore, the transfer device is downsized.

The transfer device in this aspect decelerates or stops an article simply by the article on the braking roller trying to proceed to the direction transverse to the conveying direction of the roller conveyor. Therefore, the article having been carried in the transfer device is decelerated or stopped advantageously without a complicated control or the like. Further, the braking roller ensures that the article proceeding on the transfer device is stopped at a short distance. That requires no long braking distance for stopping the article, so that the transfer device is downsized.

DESCRIPTION OF EMBODIMENT

Now, a preferred embodiment of the present invention will be described in detail below with reference to the accompanying drawings, but the present invention is not limited to the embodiment. In the following description, unless otherwise noted, a positional relationship from right to left and up and down is illustrated with reference to a normally-installed condition.

Figure 1:
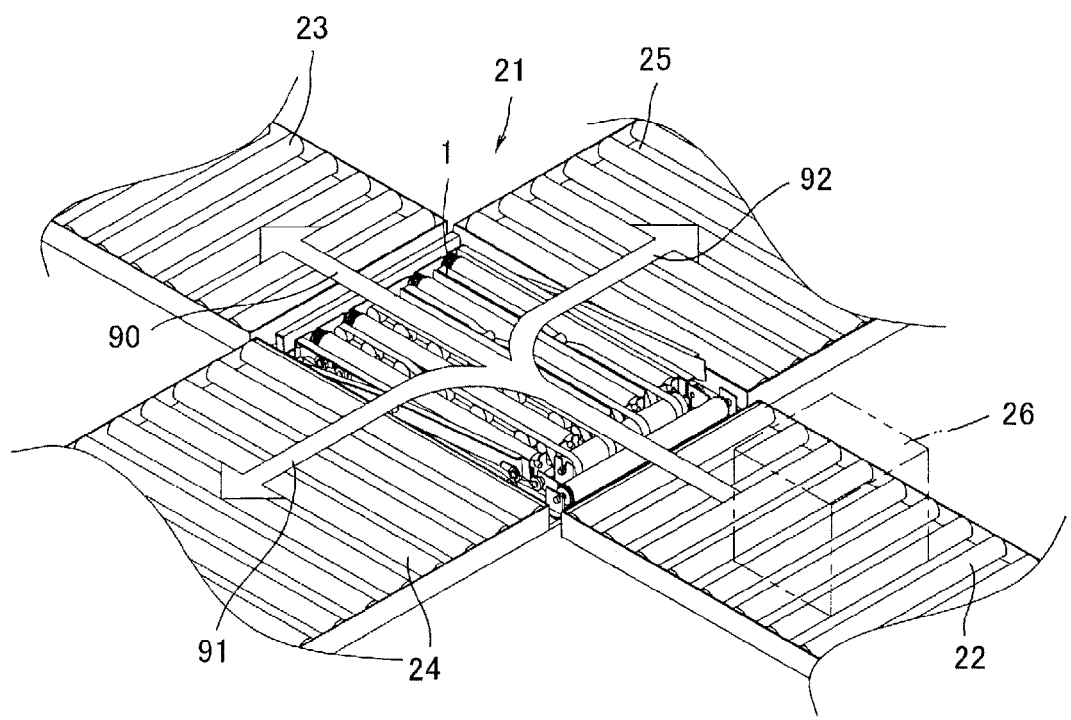
FIG. 1 is a fragmentally perspective view of a conveyor line provided with a transfer device of an embodiment of the present invention.

A transfer device 1 in the embodiment is, as shown in FIG. 1, positioned at a part where conveying paths of a conveyor line 21 intersect or diverge. The conveyor line 21 is constituted by a straight main conveyor line 90 and two subsidiary conveyor lines 91 and 92 turning in the opposing direction at a right angle. The main conveyor line 90 consists of a linearly-arranged path including an upstream conveyor 22, the transfer device 1, and a main conveyor 23, while the subsidiary conveyor lines 91 and 92 respectively consist of a path including the upstream conveyor 22, the transfer device 1, and a subsidiary conveyor 24 and a path including the upstream conveyor 22, the transfer device 1, and another subsidiary conveyor 25. The two subsidiary conveyors 24 and 25 are connected to the transfer device 1 so as to intersect with the main conveyor line 90.

The conveyor line 21 conveys an article 26 having been conveyed from the upstream conveyor 22 onto the transfer device 1 to the main conveyor 23 directly or to the subsidiary conveyor 24 or 25 by changing the article 26 in direction with the transfer device 1. Shortly, the conveyor line 21 conveys the article 26 along the main conveyor line 90 or the subsidiary conveyor line 91 or 92.

The upstream conveyor 22, the main conveyor 23, and the subsidiary conveyors 24 and 25 each are a roller conveyor having a plurality of rollers. These roller conveyors each are so configured that a plurality of driven rollers rotate upon power transmission from a driving roller, thereby conveying the placed article 26 to one direction. The roller conveyors have respective conveying surfaces, on which the article 26 is placed, on the same level, the conveying surfaces of those being substantially on the same level as a conveying surface (a first conveying surface 10 of a main conveyor part 2 when the main conveyor part 2 is lifted up or a second conveying surface 145 of a subsidiary conveyor part 3 when the subsidiary conveyor part 3 is lifted up, as described below) of the transfer device 1.

Now, the transfer device 1 in this embodiment will be described in detail below.

Figure 2:
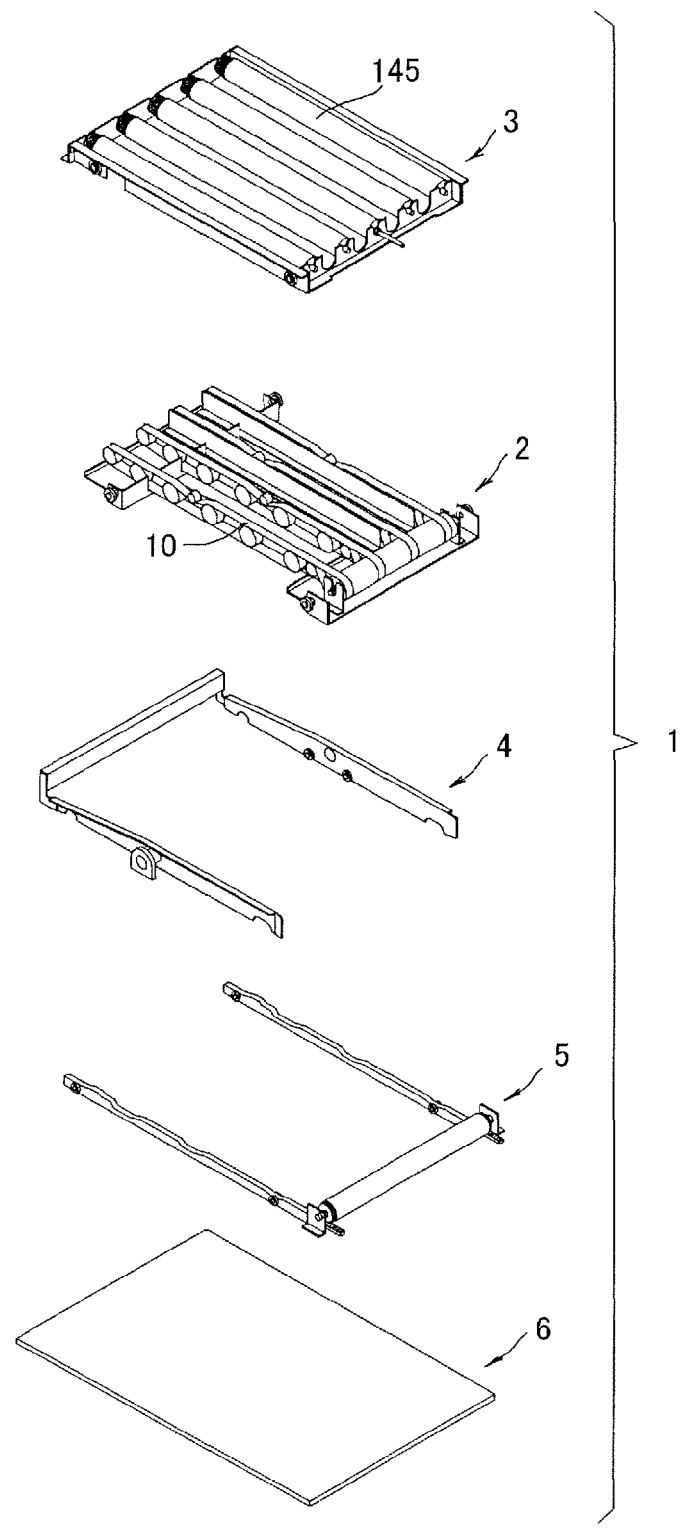
FIG. 2 is an exploded perspective view of the transfer device in the embodiment of the present invention.

The transfer device 1, as shown in FIG. 2, mainly consists of a main conveyor part 2, a subsidiary conveyor part 3, a stopper (conveyance preventer) 4, and a lifting mechanism 5, which are placed on a bottom plate 6 and housed in a container (not shown) such as a box and a casing in a united manner. Herein, the container not shown may employ the bottom plate 6 as its bottom face.

Figure 3:
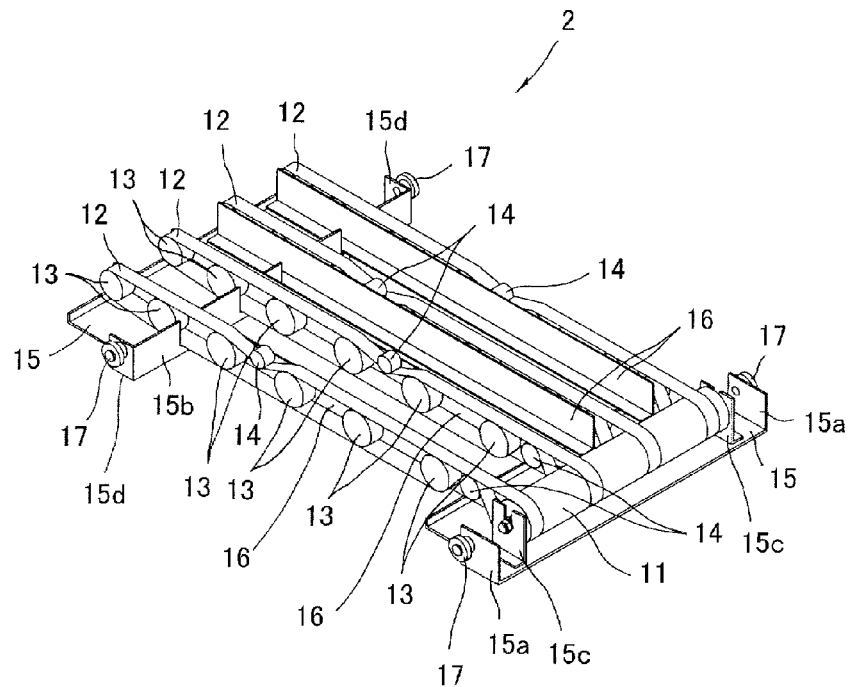
FIG. 3 is a perspective view illustrating a main conveyor part in FIG. 2.

The main conveyor part 2, as shown in FIG. 3, mainly consists of a belt driving roller (rotation member) 11, belts (linear members) 12, belt driven rollers (rotation members) 13, tension holders 14, two tabular supports 15, four roller fixing members 16, and rolling wheels 17.

In the main conveyor part 2, a flat face constituted by upper faces of the belts (linear members) 12 functions as the conveying surface 10 (FIG. 2).

The roller fixing members 16 each are an elongated member extending in an L shape in cross section, being specifically formed by an equal angle iron or the like. The four roller fixing members 16 are arranged in parallel and attached to the two supports 15 so as to connect the supports 15 located away from each other. Specifically, the roller fixing members 16 each have both ends in its longitudinal direction located on the two supports 15 and a center part located between the two supports 15.

One of the supports (hereinafter referred to as a first support) 15 has two standing plates 15c projecting from its top face and two side plates 15a formed by upwardly bending both end parts in its longitudinal direction. The two standing plates 15c and the two side plates 15a are formed in an opposed manner respectively. The belt driving roller 11 is arranged between the two standing plates 15c and rotatively held at its both ends by the standing plates 15c. The belt driving roller 11 is a roller incorporating a motor, which has a reduced mechanism in a rotatable outer tube. Additionally, there is provided a rolling wheel 17 attached to an outer face of each of the two side plates 15a. Specifically, the two rolling wheels 17 are arranged so as to project outwardly from the respective side plates 15a, or in a direction away from each other. The rolling wheels 17 each are positioned adjacent to an upper side of the side plate 15a.

On the other hand, the other of the supports (hereinafter referred to as a second support) 15 has a division plate 15b projecting from one edge part in its shorter direction and having four square U-shaped notches. Specifically, the division plate 15b is positioned at the edge part nearer to the first support 15 with the four roller fixing members 16 arranged in the notches respectively. Additionally, there is provided a side plate 15d at each end of the second support 15 in its longitudinal direction. The two side plates 15d are formed in an opposed manner and continuous from the division plate 15b. There is also provided another rolling wheel 17 attached to an outer face of each of the two side plates 15d. Specifically, the two rolling wheels 17 are arranged so as to project outwardly from the respective side plates 15d, or in a direction away from each other. The rolling wheels 17 each are positioned adjacent to an upper side of the side plate 15d.

The two supports 15 have four through-holes (not shown) in total, each support 15 having two holes, which penetrate in a thickness direction of the support 15, for forming lifting guides described below.

The roller fixing members 16 each are with the plurality of belt driven rollers 13 and the tension holders 14 attached to its side wall. The belt driven rollers 13 and the tension holders 14 are rollers, being rotatively attached to the roller fixing member 16. The belt driven rollers 13 and the is tension holders 14 attached to one roller fixing member 16 all project in a same direction. The belt driven rollers 13 are arranged in a row in a longitudinal direction of the roller fixing member 16.

Herein, the belts 12 each are spanned around the belt driven rollers 13 arranged in a row and the belt driving roller 11. Specifically, four belts 12 are spanned over the belt driving roller 11 with each of the belts 12 spanned around the driving roller 11 and the plurality of the driven rollers 13 so as to integrally rotate. In this configuration, each of the belts 12 is spanned around the belt driven rollers 13 attached to each of the roller fixing members 16. Thus, each of the belts 12 is spanned so as to extend along each of the roller fixing member 16 and pressed from above and beneath by the two tension holders 14. Specifically, between the two tension holders 14 attached to one roller fixing member 16, one located above presses the belt 12 from above, while the other located below presses the belt 12 from beneath.

Figure 4:
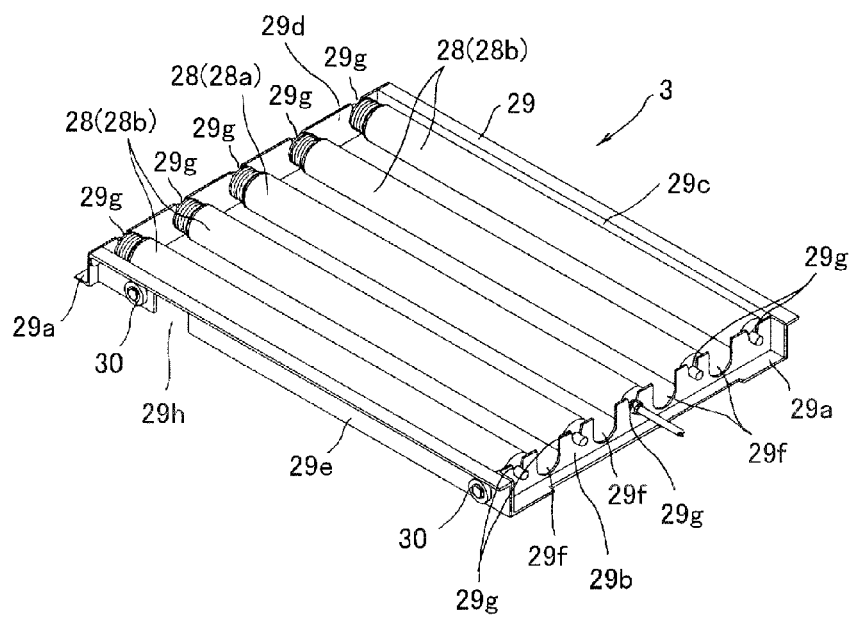
FIG. 4 is a perspective view illustrating a subsidiary conveyor part in FIG. 2.

The subsidiary conveyor part 3 is, as shown in FIG. 4, a roller conveyor constituted by a plurality of braking rollers (rollers) 28 attached to a frame (roller-side frame) 29.

In the subsidiary conveyor part 3, a flat face constituted by upper faces of the braking rollers 28 functions as the conveying surface 14S (FIG. 2). The braking rollers 28 include one braking roller 28a, which is a driving roller incorporating an appropriate member such as a motor not shown and whose movement is controllable by signals from outside. Whereas, other braking rollers 28b are driven rollers, to which power is transmitted by the driving roller (roller 28a) with a belt not shown. By this configuration, the braking rollers 28b, which are the driven rollers, are driven in accordance with the movement of the braking roller 28a, which is the driving roller.

Figure 5A:
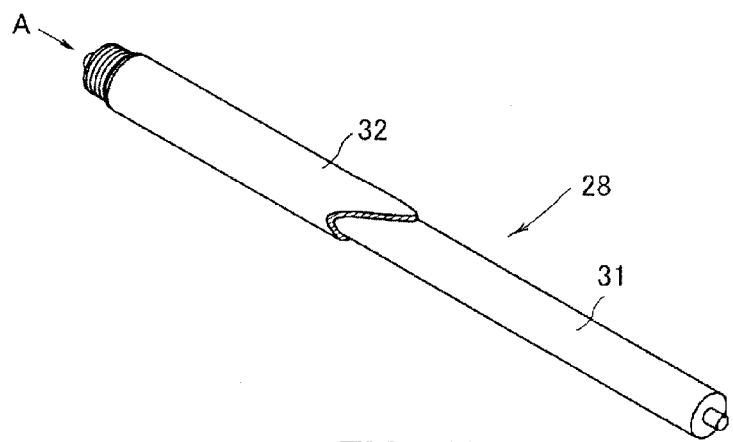
FIGS. 5A and 5B are explanatory diagrams of a braking roller in FIG. 4, FIG. 5A being a partly broken perspective view thereof and FIG. 5B being a view thereof seen from an A direction in FIG. 5A.
Figure 5B:
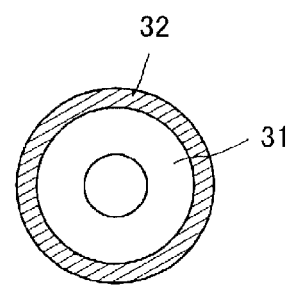

The braking rollers 28 are, as shown in FIGS. 5A and 5B, formed by a roller body 31 around which a high-frictional member (means to brake an article) 32 is covered. The high-frictional member 32 is made of a material having a high frictional coefficient such as urethane resin and rubber and covers over an outer peripheral surface of the roller body 31.

The frame 29 is, as shown in FIG. 4, constituted by four side walls 29b, 29c, 29d, and 29e.

Among the four side walls 29b to 29e, the two side walls 29b and 29d located adjacent to both sides in a longitudinal direction of the frame 29 each are formed with a plurality of U-shaped notches in a row, being of a comb shape. Specifically, the side wall 29b is formed with large notches 29f and small notches 29g arranged alternately in a row. The large notches 29f and the small notches 29g each have a substantially U-shape in configuration, extending substantially in a vertical direction and downwardly from a top edge of the side wall 29b.

On the other hand, the side wall 29d is formed with small notches 29g having a substantially U-shape in configuration and being arranged in a row.

Herein, there are provided the same number of the small notches 29g formed in the side walls 29b and 29d. Besides, the small notches 29g formed in the side walls 29b and 29d face to each other. Shortly, all the is small notches 29g formed in the side wall 29b are located on opposite side of all the small notches 29g formed in the side wall 29d.

The side walls 29b and 29d each are further formed with a brim 29a formed by a lower part of the side wall 29b or 29d bent outwardly at a substantially right angle.

Meanwhile, among the four side walls 29b to 29e, the two side walls 29c and 29e located adjacent to both sides in a shorter direction of the frame 29 each are bent outwardly at a top edge or in a direction away from each other.

Each of the side walls 29c and 29e has two rolling wheels 30 attached adjacent to opposite ends in its longitudinal direction and on its outer surface, though the two rolling wheels 30 attached to the side wall 29c are not shown. The two rolling wheels 30 attached to the side wall 29c and the two rolling wheels 30 attached to the side wall 29e are located in an opposed manner respectively and project outwardly. Shortly, the frame 29 has two pairs of rolling wheels 30 located adjacent to the opposite ends in its longitudinal direction. In each of the pairs, one of the rolling wheels 30 projects in a direction away from the other. The side walls 29c and 29e each further has a concave portion 29h penetrating the frame 29, though the concave portion 29h formed in the side wall 29c is not shown. The concave portions 29h formed in the side walls 29c and 29e are respectively positioned adjacent to ones of the rolling wheels 30 located adjacent to distal ends in the longitudinal direction of the side walls 29c and 29e with facing each other.

The brims 29a of the frame 29 have four through-holes (not shown) in total, each brim 29a having two through-holes, which penetrate in a thickness direction of the brims 29a, for forming the lifting guides described below.

Figure 6:
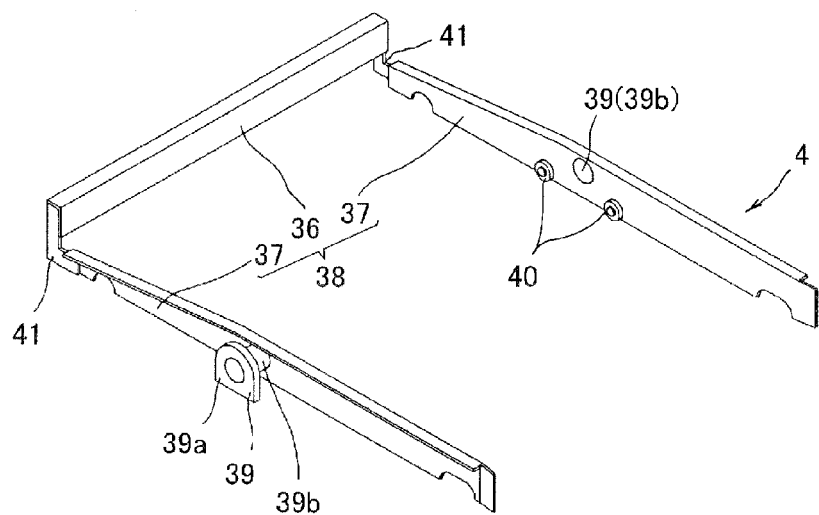
FIG. 6 is a perspective view illustrating a stopper in FIG. 2.

The stopper 4 is, as shown in FIG. 6, constituted by a stopper body 38 of a substantially square U-shape in configuration pivotally supported by two bases 39. The stopper body 38 mainly consists of a projecting piece 36 and two elongated plates 37 for up-and-down movement. The projecting piece 36 is a rectangular cubic shape. The elongated plates 37 each are of a substantially rectangular and tabular shape in configuration with two pieces of the elongated plates 37 arranged opposite to each other. The elongated plates 37 each are bent at an upper part outwardly at a substantially right angle and differ in height at both ends in its longitudinal direction. Specifically, each of the elongated plates 37 has a height lowering toward a distal end near the projecting piece 36 from the vicinity of the center part in the longitudinal direction and a constant height toward a proximal end from the vicinity of the center part.

The projecting piece 36 and the elongated plates 37 are integrally attached via two connecting brackets 41 respectively. The connecting brackets 41 each are of a substantially L shape in configuration and located between the projecting piece 36 and the respective elongated plate 37. Each of the connecting brackets 41 is fixed to an outer surface of the elongated plate 37 and a side face near an end in a longitudinal direction of the projecting piece 36.

The bases 39 each are formed by a half racetrack-shaped base body 39a being of a rectangular shape with an arcuate and rounded top and a columnar shaft 39b. The shaft 39b is attached to the base body 39a at a distal end in its longitudinal direction so as to rotate relative to the base body 39a and integrally to the elongated plate 37 at a proximal end in the longitudinal direction. Herein, the two bases 39 are also arranged opposite to each other, so that the two shafts 39b projecting in a direction approaching each other with a common central axis. The two shafts 39b each are attached to the outer surface of and adjacent to the center part in the longitudinal direction of the elongated plate 37.

In short, the stopper bodies 38 are attached so as to pivot relative to the bases 39 via the shafts 39b as rotational shafts, respectively. In this configuration, as one ends in the longitudinal direction of the elongated plates 37 go up, the other ends go down, like a seesaw. In other words, the opposite ends in the longitudinal direction of the two elongated plates 37 move alternately up and down.

Each of the elongated plates 37 has two rolling wheels 40 attached to its inner surface. That is, four rolling wheels 40 are attached in total to the two elongated plates 37, though the two rolling wheels 40 attached to one of the plates 37 are not shown. The two rolling wheels 40 attached to the one elongated plate 37 are respectively arranged opposite to the two rolling wheels 40 attached to the other elongated plate 37. Shortly, the two elongated plates 37 have two pairs of rolling wheels 40 formed at their inner surfaces, each pair projecting in a direction approaching each other pair. The rolling wheels 40 facing each other have a common central axis.

In regard to the two rolling wheels 40 attached to one of the elongated plates 37, the rolling wheels 40 are attached at positions away by the same distance from a position where the elongated plate 37 and the base 39 are connected, that is, a position to which the shaft 39b of the base 39 is attached. Besides, the central axises of the rolling wheels 40 are on the same level.

Figure 7:
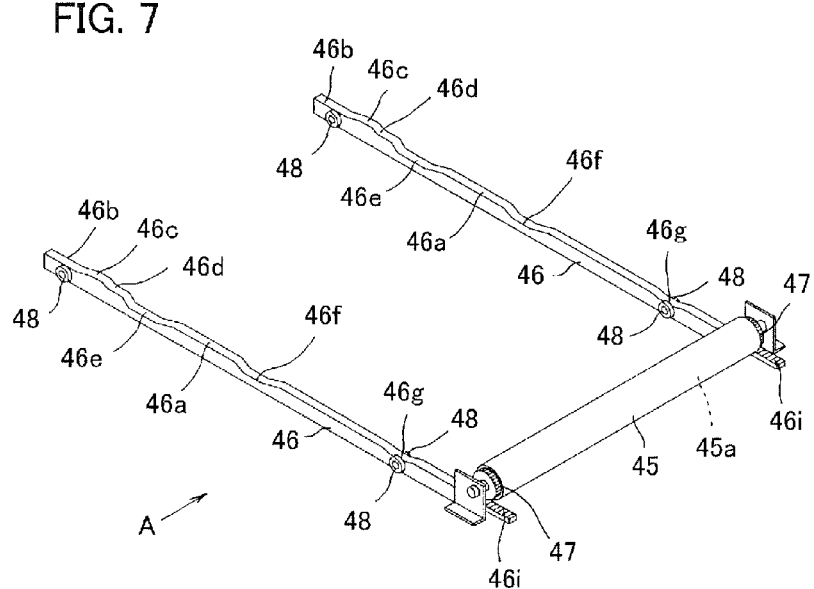
FIG. 7 is a perspective view illustrating a lifting mechanism in FIG. 2.

The lifting mechanism 5 is, as shown in FIG. 7, constituted by engaging a switching roller 45 with two horizontally-moving members 46. The horizontally-moving members 46 move upon power transmission from output members 47 of the switching roller 45.

The switching roller 45 is constituted by an outer tube forming an outer peripheral surface and a roller 45a incorporating a motor and inserted in the outer tube. The outer tube is arranged rotatively relative to the motor-incorporating roller 45a. The switching roller 45 is supported by attaching shafts of the motor-incorporating roller 45a to fixing members at its opposite ends. The motor-incorporating roller 45a has the toothed output members 47 attached to opposite ends in its longitudinal direction. The two output members 47 rotate with rotation of the motor-incorporating roller 45a.

Herein, a rotation amount of the roller 45a is appropriately controlled by a member not shown such as an external controlling device or a limit switch. That also appropriately controls a rotation amount of the output members 47 attached to the roller 45a.

As described above, the outer tube forming the outer peripheral surface of the switching roller 45 is arranged rotatively relative to the motor-incorporating roller 45a, so as not to rotate even with the rotation of the motor-incorporating roller 45a. Conversely, the rotation of the outer tube never interferes with the rotation of the motor-incorporating roller 45a. Consequently, even when an article is conveyed on the switching roller 45, the article makes only the outer tube to rotate, so that the rotation of the motor-incorporating roller 45a is controlled independently with conveyance of the article.

Figure 8:
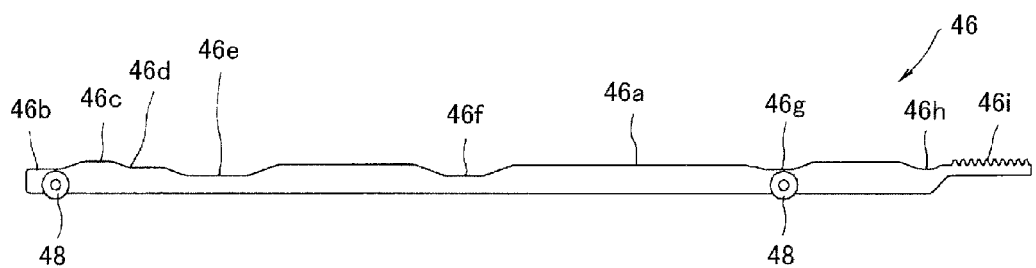
FIG. 8 is a view of a horizontally-moving member in FIG. 7 seen from an A direction.

Each of the horizontally-moving members 46 is, as shown in FIGS. 7 and 8, of a substantially rectangular parallelepiped shape with two rolling wheels 48 arranged at its side face. That is, four rolling wheels 48 are attached in total to one horizontally-moving member 46. In regard to one side face of the horizontally-moving member 46, one rolling wheel 48 is positioned adjacent to a distal end in a longitudinal direction of the member 46, while the other rolling wheel 48 is positioned slightly nearer the center from a proximal end in the longitudinal direction. Herein, the two rolling wheels 48 attached to the one side face have respective common central axises with two rolling wheels 48 attached to the other side face. The four rolling wheels 48 respectively project in a direction away from the side faces.

The horizontally-moving member 46, as shown in FIG. 8, has a top face including a plurality parts having different levels. Specifically, there are formed a protrusion and recesses at a flat face 46a of the top of the horizontally-moving member 46. More specifically, there are formed a first low part 46b, a high part 46c, a second low part 46d, a third low part 46e, a fourth low part 46f, a fifth low part 46g, a sixth low part 46h from the distal end to the proximal end in the longitudinal direction of the horizontally-moving member 46. Besides, there is formed a rack 46i adjacent to the proximal end and adjacent to the sixth low part 46h.

The high part 46c is higher than the flat face 46a, while the six low parts (the first, second, third, fourth, fifth, and sixth low parts 46b to 46h) are lower than the flat face 46a. The first, second, fifth, and sixth low parts 46b, 46d, 46g, and 46h are on the same level, while the third and fourth low parts 46e and 46f are on the same level, but still lower than the other four low parts 46b, 46d, 46g, and 46h. The first low part 46b, the high part 46c, the second low part 46d, and the third low part 46e form a smooth and continuous curve, while an end portion of the third low part 46e, the fourth low part 46f, the fifth low part 46g, and the sixth low part 46h are also smoothly continuous to peripheral parts.

The rack 46i has rack teeth formed by an appropriate means such as a gear-cutting processing and is a planar shape with a lower part thereof cut out.

Now, an assembly structure of the transfer device 1 in the present invention will be described in detail below with reference to FIGS. 9 to 12.

Figure 9:
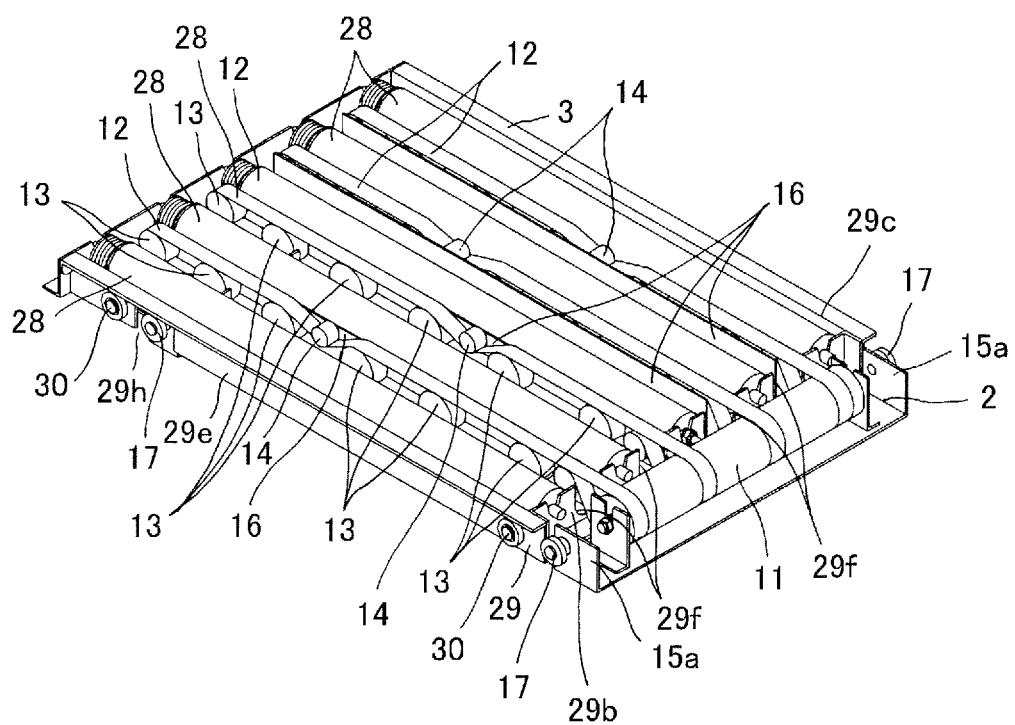
FIG. 9 is a perspective view showing the main conveyor part and the subsidiary conveyor part in FIG. 2 when arranged in combination.

The main conveyor part 2 is, as shown in FIG. 9, arranged so as to overlap with the subsidiary conveyor part 3. In this configuration, the belt driving roller 11 is positioned outside the subsidiary conveyor part 3 and adjacent to the proximal end in the longitudinal direction of the subsidiary conveyor part 3. Each group consisting of the roller fixing member 16 and the belt driven rollers 13 and tension holders 14 attached to the roller fixing member 16 of the main conveyor part 2 is positioned between adjacent braking rollers 28 of the subsidiary conveyor part 3. The belts 12 each are spanned around the belt driving roller 11 positioned outside the subsidiary conveyor part 3 and the belt driven rollers 13 positioned inside the subsidiary conveyor part 3. Each of the belts 12 passes through the large notch 29f formed at the side wall 29b of the subsidiary conveyor part 3, so as to be spanned around inside and outside the subsidiary conveyor part 3.

The side plates 15a of the main conveyor part 2 are positioned outside the frame 29 of the subsidiary conveyor part 3 and adjacent to the proximal ends in the longitudinal direction of the side walls 29c and 29e of the frame 29. The rolling wheels 17 project outwardly from the respective side plates 15a.

Further, the rolling wheels 17 of the main conveyor part 2 project outwardly from the concave portions 29h formed at the side walls 29c and 29e of the subsidiary conveyor part 3 respectively (the rolling wheels 17 projecting from the side walls 29c not shown).

Figure 10:
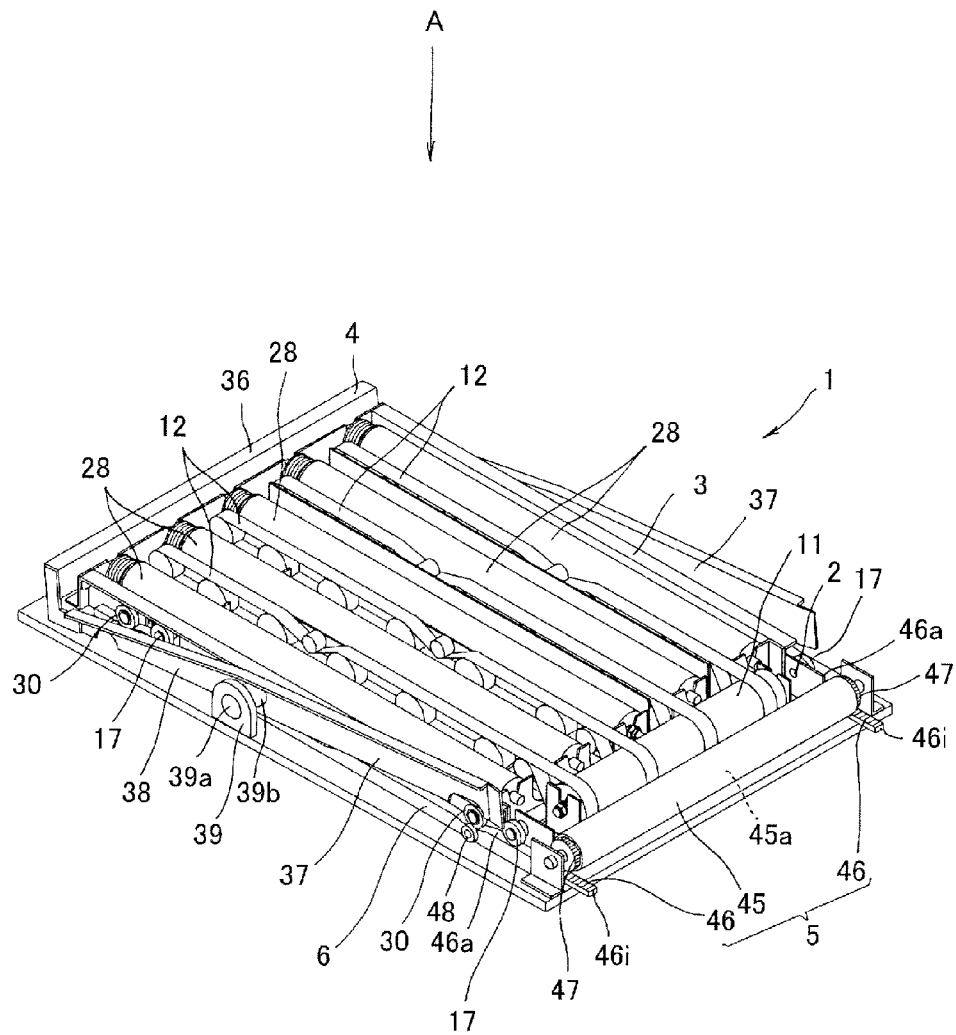
FIG. 10 is a perspective view showing the combined main and subsidiary conveyor parts in FIG. 9 and the stopper and the lifting mechanism in FIG. 2 when arranged in combination.

Then, as shown in FIG. 10, the main conveyor part 2 and the subsidiary conveyor part 3 are mounted on the bottom plate 6. The stopper 4 and the lifting mechanism 5 are arranged so as to surround an outer side of the main conveyor part 2 and the subsidiary conveyor part 3 and mounted on the bottom plate 6. In this configuration, the switching roller 45 of the lifting mechanism 5 is next to the belt driving roller 11, both rollers 11 and 45 having a common axial direction (thrust direction).

The two horizontally-moving members 46 are arranged adjacent to opposite ends in a shorter direction of the main conveyor part 2 and the subsidiary conveyor part 3 and outside the parts 2 and 3. The two horizontally-moving members 46 extend along the longitudinal directions of the main conveyor part 2 and the subsidiary conveyor part 3, so as to come below the rolling wheels 17 in the main conveyor part 2 and the rolling wheels 30 in the subsidiary conveyor part 3. Thus, the rolling wheels 17 in the main conveyor part 2, the rolling wheels 30 in the subsidiary conveyor part 3, and the rolling wheels 40 in the stopper 4 (see FIG. 6) are placed on the top faces of the horizontally-moving members 46. In this configuration, the four rolling wheels 48 attached to each of the horizontally-moving members 46 are located on the bottom plate 6, so that the horizontally-moving members 46 are designed to run along its longitudinal direction on the bottom plate 6.

The two elongated plates 37 in the stopper 4 are positioned outside the two horizontally-moving members 46, respectively. In this configuration, the projecting piece 36 in the stopper 4 and the switching roller 45 in the lifting mechanism 5 are placed in an opposed manner. Besides, the base bodies 39a of the bases 39 in the stopper 4, which are outside the elongated plates 37, are fixed to the bottom plate 6.

Figure 11:
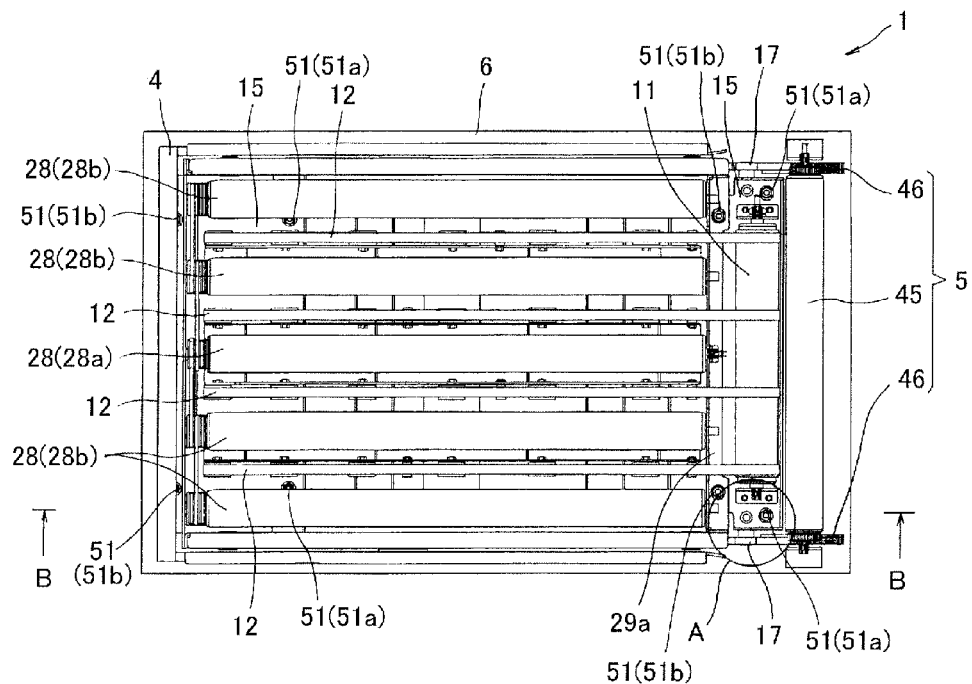
FIG. 11 is a plan view of the transfer device in FIG. 10 seen from an A direction.

As shown in FIG. 11, there are provided a plurality of lifting guides 51 formed between the main and subsidiary conveyor parts 2 and 3 and the bottom plate 6. The lifting guides 51 are designed to urge downwardly either one or both of the supports 15 in the main conveyor part 2 and the brim 29a in the frame 29 of the subsidiary conveyor part 3. The transfer device 1 in this embodiment has four lifting guides 51a in the main conveyor part 2 and four lifting guides 51b in the subsidiary conveying part 3; or eight lifting guides 51 in total.

Figure 12:
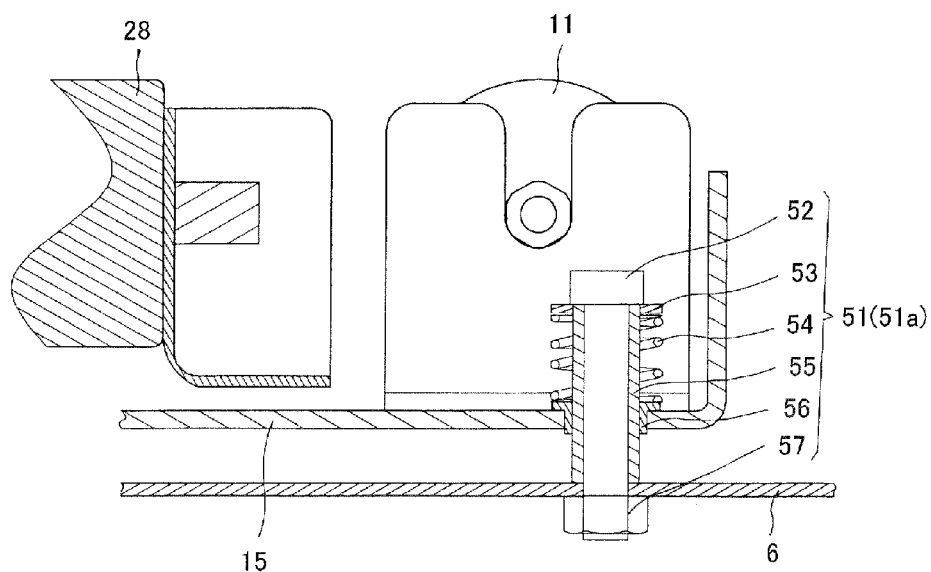
FIG. 12 is a cross section of an A part in FIG. 11 taken along a line B-B.

The lifting guides 51a in the main conveyor part 2 each, as shown in FIG. 12, mainly consist of a hexagon socket bolt 52, a plain washer 53, a coil spring 54, a tubular member 55, a shaft bearing 56, and a nut 57.

The hexagon socket bolt 52 has a shaft inserted in the tubular member 55. The shaft of the bolt 52 is longer than the tubular member 55, so as to partly project from the tubular member 55. The bolt 52, which is inserted in the tubular member 55, penetrates through the plain washer 53, the coil spring 54, the shaft bearing 56, and a through-hole formed in the bottom plate 6 in this order, and then the nut 57 is attached to the bolt 52 at a part below the bottom plate 6. Herein, the shaft bearing 56 is a no-lubricant dry bearing and fitted in the through-holes in the support 15 so as to be integral with the support 15.

A portion of the shaft of the bolt 52 inserted in the tubular member 55 is positioned above the bottom plate 6. Thus, only a portion of the shaft without the tubular member 55 penetrates through the bottom plate 6, with an end face in a longitudinal direction of the tubular member 55 having contact with the top surface of the bottom plate 6. When the support 15 (the main conveyor part 2) approach and move away from the bottom plate 6, the shaft bearing 56 glides along and relative to an outer peripheral surface of the tubular member 55.

The lifting guides 51b in the subsidiary conveyor part 3 each also mainly consist of a hexagon socket bolt 52, a plain washer 53, a coil spring 54, a tubular member 55, a shaft bearing 56, and a nut 57 (not shown). Shortly, the lifting guides 51b each have the same configuration as that in the lifting guides 51a in the main conveyor part 2 except that the shaft bearing 56 is attached to the through-hole formed in the brim 29a in the frame 29.

Now, an operation of the transfer device 1 in this embodiment will be described in detail below. In the following description, a "carry-in direction" denotes a direction toward the transfer device 1 from the upstream conveyor 22 adjacent to the transfer device 1. A "conveying direction" of the subsidiary conveyor part 3 is a direction transverse to the carry-in direction.

The transfer device 1 in this embodiment is, as shown in FIG. 1, designed to change a travelling direction of the article 26 having been conveyed from upstream, according to need. Specifically, the transfer device 1 is designed to switch between conveyance of the article 26 by the main conveyor line 90 along the carry-in direction with no change in direction and conveyance of the article 26 by the subsidiary conveyor line 91 or 92 with change of a travelling direction to a direction transverse to the carry-in direction.

The conveyor line 21 employing the transfer device 1 in this embodiment obtains information relating to the article 26 with a presence sensor (not shown) or the like at upstream of the transfer device 1 in the conveying direction. A controller (not shown) determines by which of the conveyor lines 90, 91, and 92 the article 26 is to be conveyed according to the obtained information.

Upon determination of the use of the subsidiary conveyor line 91 or 92 to convey the article 26, the controller (not shown) lifts up the subsidiary conveyor part 3 in the transfer device 1 and lifts down the main conveyor part 2. The subsidiary conveyor part 3 has been completely lifted up before the article 26 is carried in the transfer device 1, so that the conveying surface 145 formed by the subsidiary conveyor part 3 forms an overall conveying surface of the transfer device 1.

Figure 13A:
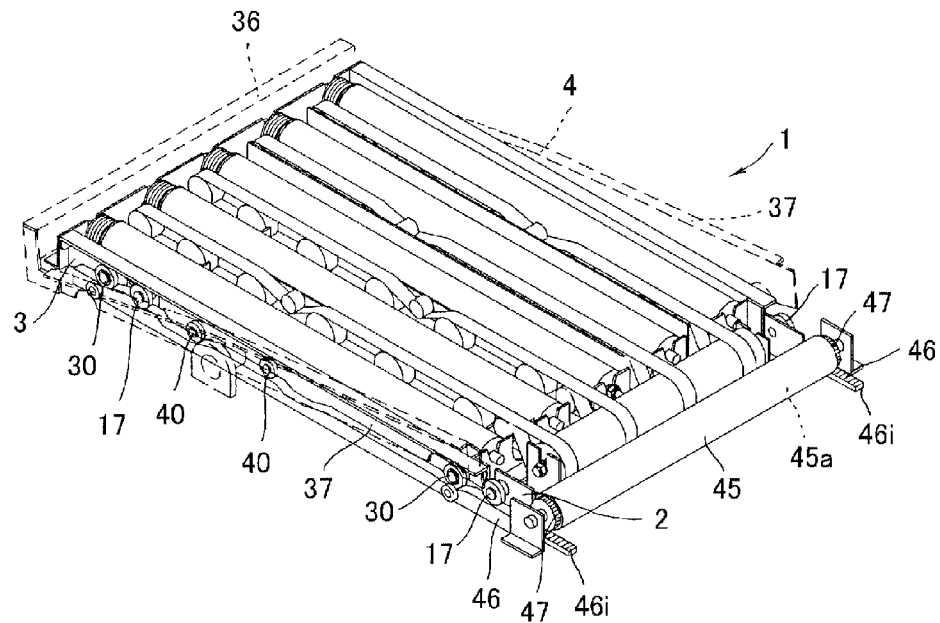
FIGS. 13A and 13B are explanatory diagrams illustrating the transfer device in FIG. 1 when the transfer device switches a conveying direction of an article, FIG. 13A showing a state in which the main conveyor part is positioned above and FIG. 13B showing a state in which the subsidiary conveyor part is positioned above.
Figure 13B:
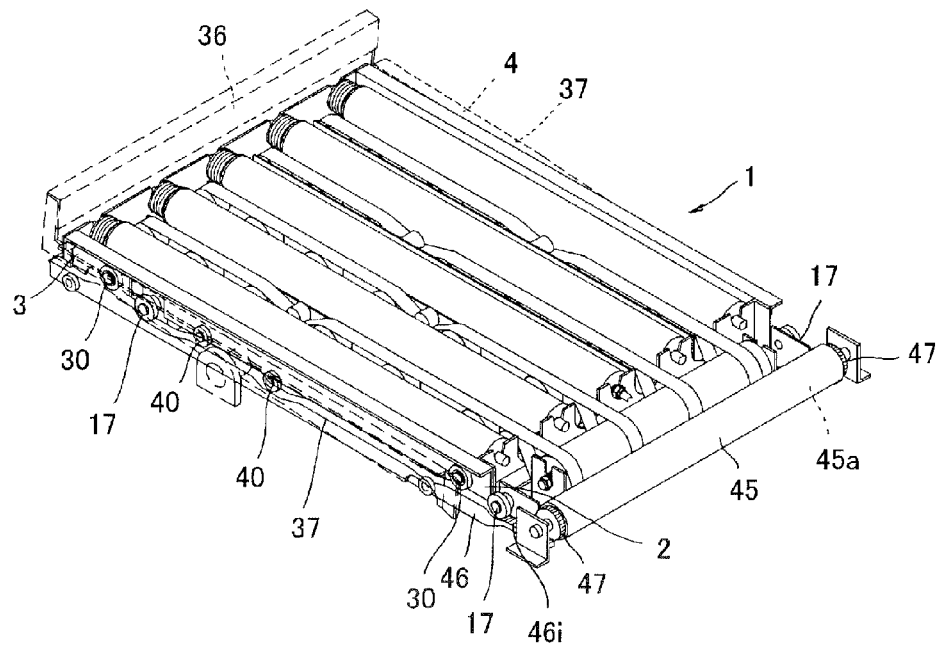
Figure 14A:
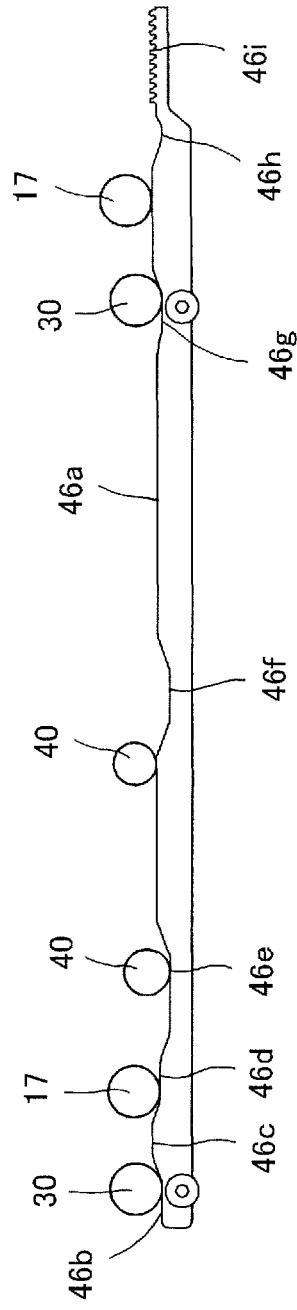
FIGS. 14A and 14B are explanatory diagrams illustrating a movement of the horizontally-moving member and rolling wheels when the transfer device in FIG. 1 switches a conveying direction of an article, FIG. 14A showing a state in which the main conveyor is positioned above and FIG. 14B showing a state in which the subsidiary conveyor part is positioned above.

Specifically, in a condition shown in FIGS. 13A and 14A, the controller (not shown) makes the motor of the roller 45a in the switching roller 45 to rotate at a predetermined amount. That makes the two output members 47 to rotate at the predetermined amount, thereby horizontally moving the two horizontally-moving members 46, in which the racks 46i are engaged with the respective toothed output members 47. Thereby, the transfer device 1 becomes a condition shown in FIGS. 13B and 14B.

The two horizontally-moving members 46 are simultaneously moved along a longitudinal direction of the transfer device 1 at the same distance. When the subsidiary conveyor part 3 is lifted up, the horizontally-moving members 46 are moved from an end portion where the switching roller 45 is situated to another end portion where the projecting piece 36 in the stopper 4 is situated.

Figure 14B:
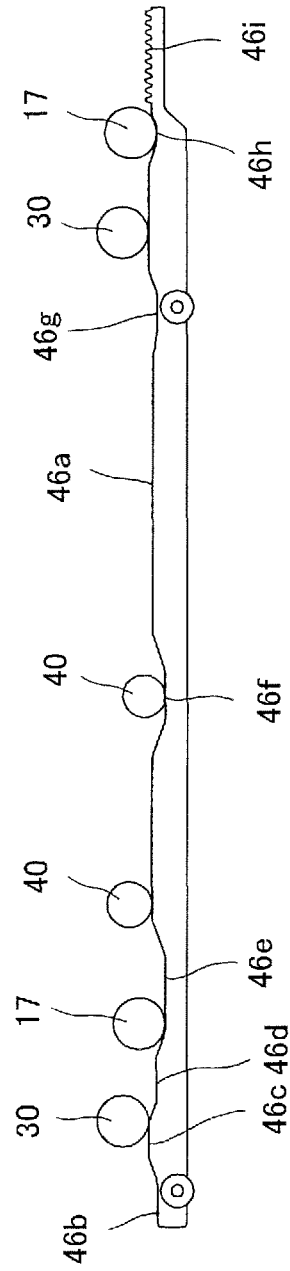

In accordance with the movement of the horizontally-moving members 46, the plurality of rolling wheels situated on the members 46 are moved relative to the members 46. Specifically, as shown in FIGS. 14A and 14B, the rolling wheels 17 attached to the main conveyor part 2 move to lower parts respectively, while the rolling wheels 30 attached to the subsidiary conveyor part 3 move to higher parts. More specifically, at one of the horizontally-moving members 46, one of the rolling wheels 17 moves from the second low part 46d to the third low part 46e, while the other of the rolling wheels 17 moves from the flat face 46a to the sixth low part 46h. Meanwhile, one of the rolling wheels 30 moves from the first low part 46b to the high part 46c, while the other of the rolling wheels 30 moves from the fifth low part 46g to the flat face 46a. At this time, also at the other of the members 46, the rolling wheels 17 and the rolling wheels 30 relatively move in the same manner as at the one of the members 46.

Shortly, the main conveyor part 2 and the subsidiary conveyor part 3 integrally provided with the rolling wheels 17 and 30 are lifted up and down (lifting means) by making the rolling wheels 17 and 30 on the horizontally-moving members 46 to drop in the lower parts of or to move up on the higher parts of the top face of the members 46. At this time, the movement including a horizontal component of the horizontally-moving members 46 is converted to a lifting movement of the main conveyor part 2 and the subsidiary conveyor part 3 (converting means). The members 46 and the rolling wheels 17 constitute a support lifting portion, whereas the members 46 and the rolling wheels 30 constitute a frame lifting portion.

When the main conveyor part 2 and the subsidiary conveyor part 3 are lifted up and down, the lifting guides 51 (FIGS. 11 and 12) restrict a movement toward an unanticipated direction. Therefore, the main and the subsidiary conveyor parts 2 and 3 move without undesired displacement or slip. Further, the lifting guides 51 normally urge the main and the subsidiary conveyor parts 2 and 3 downwardly, thereby stabilizing postures of the main and the subsidiary conveyor parts 2 and 3 having been moved.

When the subsidiary conveyor part 3 is lifted up, the projecting piece 36 in the stopper 4 is also lifted up. At this time, at least a part of the projecting piece 36 is located above top of all the rollers constituting the subsidiary conveyor part 3.

Specifically, when the horizontally-moving members 46 move as described above, referring to FIGS. 13A to 14B, the rolling wheels 40 attached to the elongated plates 37 in the stopper 4 move on the top faces of the members 46. At this time, at one of the members 46, one of the rolling wheels 40 moves from a lower part to a higher part, while the other of those move from a higher part to a lower part. Specifically, the one rolling wheel 40 moves from the third low part 46e to the flat face 46a, while the other rolling wheel 40 moves from the flat face 46a to the fourth low part 46f. The two rolling wheels 40 are the same in size with the rolling wheel 40 situated on the flat face 46a being at a higher level than the other rolling wheel 40 situated on the fourth low part 46f.

Herein, the two rolling wheels 40 are attached to the elongated plate 37 on the same level at positions away from each other in the longitudinal direction of the plate 37. Thus, when the one rolling wheel 40 moves above the other rolling wheel 40, the end part in the longitudinal direction of the elongated plate 37 and positioned adjacent to the one rolling wheel 40 having moved above moves above. That is, the elongated plate 37 inclines. At this time, the two rolling wheels 40 also move relatively on the other horizontally-moving member 46 as well as the one member 46, so that the elongated plate 37 inclines in the same manner as described above.

When the subsidiary conveyor part 3 is lifted up, the rolling wheels 40 adjacent to the projecting piece 36 are located above the other rolling wheels 40 on the both top faces of the two horizontally-moving members 46. Therefore, the end part, to which the projecting piece 36 is attached, in the longitudinal direction of the two elongated plates 37 moves upwardly.

In this way, the horizontally-moving members 46 are moved back and forth in a horizontal direction so as to move the two rolling wheels 40 of each member 46 relatively up and down in different directions, thereby moving up and down the end portions of the elongated plates 37 in different directions. That lifts up and down the projecting piece 36 attached to the edges in the longitudinal direction of the elongated plates 37. The members 46, the rolling wheels 40, and the elongated plates 37 constitute a conveyance preventer-lifting portion.

Figure 15A:
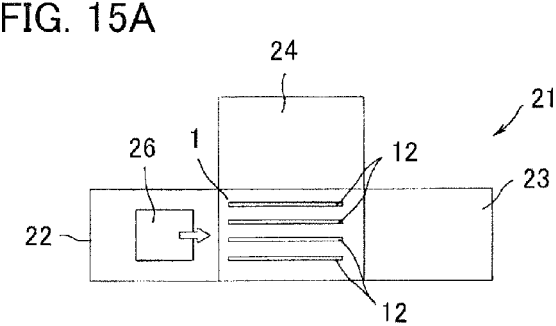
FIGS. 15A to 15E are explanatory diagrams illustrating movements of an article when the transfer device in FIG. 1 switches a conveying direction of the article, the article moving from FIG. 15A to FIG. 15E in order.
Figure 15B:
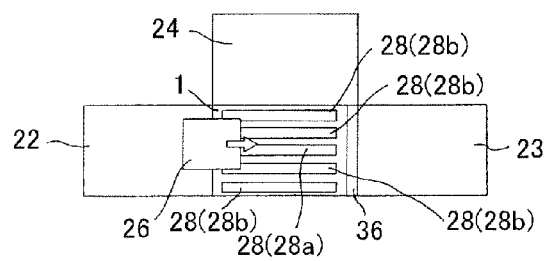

Upon lifting up of the subsidiary conveyor part 3 and the projecting piece 36 in the stopper 4 after the controller (not shown) has determined conveyance of the article 26 by the subsidiary conveyor line 91 or 92, as shown in FIG. 15B, the article 26 is carried in the transfer device 1 where the lifting up of those has been completed. Herein, before the article 26 has been entirely placed on the transfer device 1 after starting of carrying of the article 26 in the transfer device 1, a member such as a presence sensor (not shown) detects the article 26 having been carried in the transfer device 1. Upon detection of the article 26 having been carried in the transfer device 1, the controller (not shown) drives the driving roller 28a in the subsidiary conveyor part 3, so as to start driving of the braking rollers 28 in the subsidiary conveyor part 3.

Figure 15C:
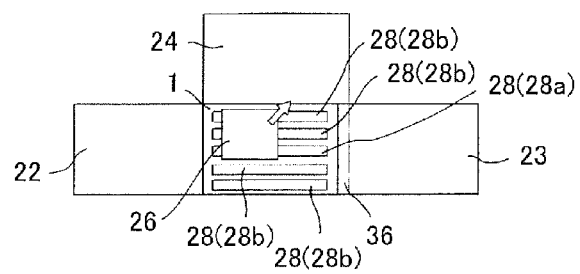
Figure 15D:
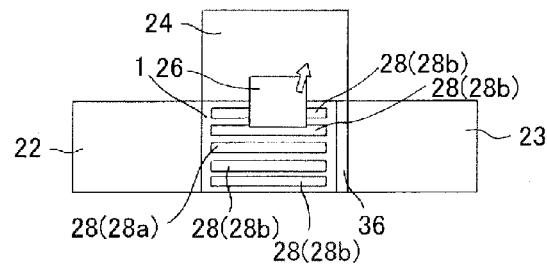

The article 26 having been carried in the subsidiary conveyor part 3 moves along the carry-in direction (direction shown by an arrow in FIG. 15B). At this time, a frictional force generated between the article 26 and the high-frictional members 32 (see FIGS. 5A and 5B) around the braking rollers 28 reduces a thrust force of the article 26 in the carry-in direction as the article 26 moves in the carry-in direction. Hence, the article 26 is moved with reducing the speed in the carry-in direction. Since being placed on the braking rollers 28 in the subsidiary conveyor part 3 at this time, the article 26 is accelerated in the conveying direction of the subsidiary conveyor part 3 upon driving of the braking rollers 28. In other words, the article 26 is decelerated in the carry-in direction and simultaneously accelerated in the conveying direction of the subsidiary conveyor part 3. Consequently, the article 26, as shown in FIGS. 15C and 15D, moves diagonally relative to the carry-in direction (direction including a component in the conveying direction of the main conveyor part 2 and another component in the conveying direction of the subsidiary conveyor part 3), with an inclination angle of the traveling direction of the article 26 relative to the carry-in direction being greater as moving on.

More specifically, when being carried in the transfer device 1, the article 26 is carried in the subsidiary conveyor part 3 with no rotation drive of the braking rollers 28. The traveling direction (carry-in direction) of the article 26 and the thrust direction of the braking rollers 28 (direction along the rotational axis and the longitudinal direction of the braking rollers 28) in the subsidiary conveyor part 3 are the same. A frictional force is generated between a part of the article 26 and the braking rollers 28 at a stop, so that a force in the thrust direction is added to the braking rollers 28 by the article 26. Herein, the braking rollers 28 are prevented from rotation drive even with a force to the thrust direction. In other words, even if being supported with freely-running, the braking rollers 28 are prevented from rotation unless a force is added in a peripheral direction, that is, the braking rollers 28 do not rotate by a force added in the thrust direction. Thus, the article 26 runs on the no-rotating braking rollers 28 with a frictional force added. No rotation of the braking rollers 28 prevents distribution of vertical weight load acting on the braking rollers 28 from the article 26, thereby ensuring a greater frictional force added to the article 26. Thus, the article 26 is braked by a strong force.

Further, a braking distance becomes long because the traveling direction of the article 26 and the longitudinal direction of the braking rollers 28 in the subsidiary conveyor part 3 are the same.

Still further, it is easy and certainly to add a force to the article 26 in the conveying direction of the subsidiary conveyor part 3, in comparison with a case where the article 26 is carried in the braking rollers 28 having been driven, because the braking rollers 28 are driven when the article 26 is partly placed on the transfer device 1. Further, in comparison with a case where the article 26 is conveyed by the subsidiary conveyor part 3 after having been entirely placed on the transfer device 1, the conveying speed is increased.

Besides, in the transfer device 1, the projecting piece 36 in the stopper 4 is lifted up and is located at the end part in the longitudinal direction of the transfer device 1 and adjacent to the main conveyor 23. That means, a part of the stopper 4 is arranged at a distal end portion in the carry-in direction of the transfer device 1. Thereby, the article 26 is certainly stopped to further proceed in the carry-in direction (i.e., proceed into the main conveyor 23) by being brought into contact with the stopper 4 even when the article 26 has excessively proceeded in the carry-in direction.

Figure 15E:
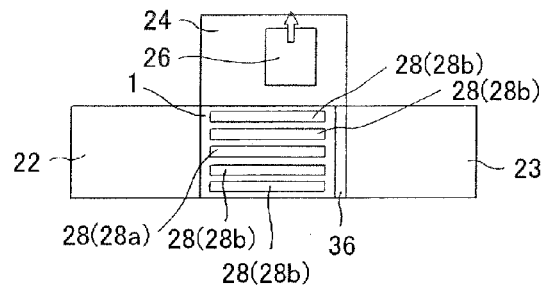

After having been conveyed on the subsidiary conveyor part 3, the article 26 is conveyed to the subsidiary conveyor 24 downstream in the conveying direction. Then, as shown in FIG. 15E, the article 26 is conveyed by the subsidiary conveyor 24.

Herein, though FIGS. 15A to 15E illustrate only the subsidiary conveyor 24 as a conveyor downstream of the transfer device 1 for convenience of drawing figures, the conveyor downstream of the transfer device 1 may consist of the subsidiary conveyors 24 and 25, as shown in FIG. 1. Specifically, the controller (not shown) can branch and convey articles 26 into the two subsidiary conveyors 24 and 25. When the article 26 is to be conveyed to the subsidiary conveyor 25, it is only necessary to rotate the braking rollers 28 in a direction opposite to that in a case of conveyance to the subsidiary conveyor 24.

Now, a case where the controller (not shown) determines to convey the article 26 by the main conveyor line 90 when the article 26 has approached the transfer device 1 will be described. In the transfer device 1, when the main conveyor part 2 has been lifted up, the article 26 is straightly, without change in direction, conveyed, while when the subsidiary conveyor part 3 has been lifted up, the subsidiary conveyor part 3 is lifted down and simultaneously the main conveyor part 2 is lifted up. At this time, the motor of the motor-incorporating roller 45a in the switching roller 45 is rotated at the same amount of and in a direction opposite to that in the aforementioned case of lifting up of the subsidiary conveyor part 3. That makes the two horizontally-moving members 46 to move along the longitudinal direction of the transfer device 1 by the same distance and in a direction opposite to that in the case of lifting up of the subsidiary conveyor part 3. All the rolling wheels relatively move on the horizontally-moving members 46, and whereby the main conveyor part 2 is lifted up and the subsidiary conveyor part 3 and the projecting piece 36 in the stopper 4 are lifted down.

Upon lifting down of the projecting piece 36 in the stopper 4, as described above, the other end portions without the projecting piece 36 of the elongated plates 37 are lifted up. The end portions having been lifted up function as a guide restricting the conveying direction of the article 26. Specifically, the end portions project from opposite ends in the shorter direction of the transfer device 1, thereby preventing the article 26 from proceeding to the subsidiary conveyors 24 and 25. The end portions lifted up have edges slightly bent outwardly in a direction away from each other.

In the transfer device 1 in this embodiment, all the rolling wheels respectively attached to the switching roller 45, the horizontally-moving members 46, the main conveyor part 2, and the subsidiary conveyor part 3 are located adjacent to side edges of the transfer device 1. In other words, the members relating to lifting up and down of the main and the subsidiary conveyor parts 2 and 3 are located adjacent to the opposite ends in the shorter direction of the transfer device 1, and additionally, at positions where the main and the subsidiary conveyor parts 2 and 3 overlap. That lowers a height of the transfer device 1 in comparison with a configuration in which a main conveyor, a subsidiary conveyor, and a lifting mechanism for conveyors are arranged overlapped.

The lowered height of the transfer device 1 shortens moving distances of the main and the subsidiary conveyor parts 2 and 3 in order to lift up and down the parts 2 and 3. Consequently, in the transfer device 1 in this embodiment, since the moving distances of the main and the subsidiary conveyor parts 2 and 3 are short, a switching operation between the main conveyor part 2 and the subsidiary conveyor part 3 is made faster.

In the above-mentioned embodiment, the braking rollers 28 are driven when the article 26 is partly placed on the braking rollers 28 and before the article 26 has been entirely placed on the braking rollers 28 with the braking rollers 28 stopped. However, it is not limited thereto to perform a conveyance control of the article 26 to the subsidiary conveyors 24 and 25 by the subsidiary conveyor part 3. The article 26 may be, for example, carried in the subsidiary conveyor part 3 with the braking rollers 28 driven. Alternatively, the braking rollers 26 may be driven after the article has been entirely placed on the subsidiary conveyor part 3. Those controls may be appropriately modified.

The conveyance control may be appropriately modified depending on a situation of the conveyor line 21. The article 26 may be, for example, conveyed to the subsidiary conveyor 24 or 25 after temporarily standing by on the transfer device 1 in a case where conveyance of another article has not been finished on the subsidiary conveyor 24 or 25. In this case, it is not necessary to additionally perform a deceleration control of the article 26 because a thrust force of the article 26 in the carry-in direction is reduced only by proceeding of the article 26 into the transfer device 1. Consequently, only no driving of the braking rollers 28 stops the article 26 on the transfer device 1.

In the above-mentioned embodiment, the rollers constituting the roller conveyor of the subsidiary conveyor part 3 consist entirely of the braking rollers 28, but the present invention is not limited thereto. It is possible to combine the braking rollers 28 and conveyance rollers in the art so as to constitute the roller conveyor.

Figure 16:
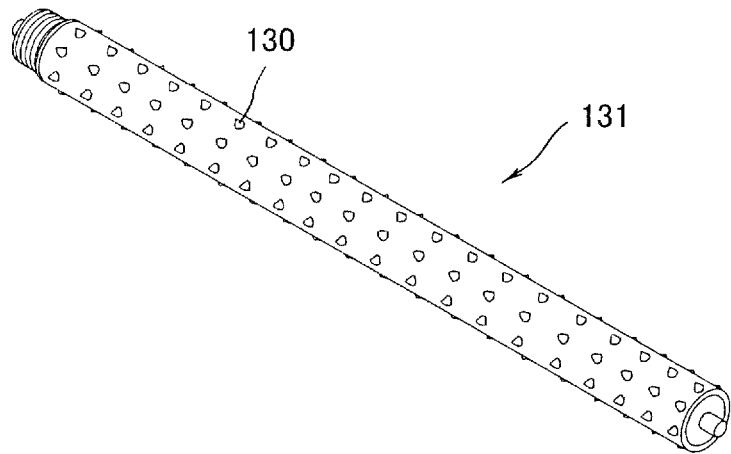
FIG. 16 is a perspective view of a braking roller employed in a transfer device in an embodiment modified from that in FIG. 1.
Figure 17:
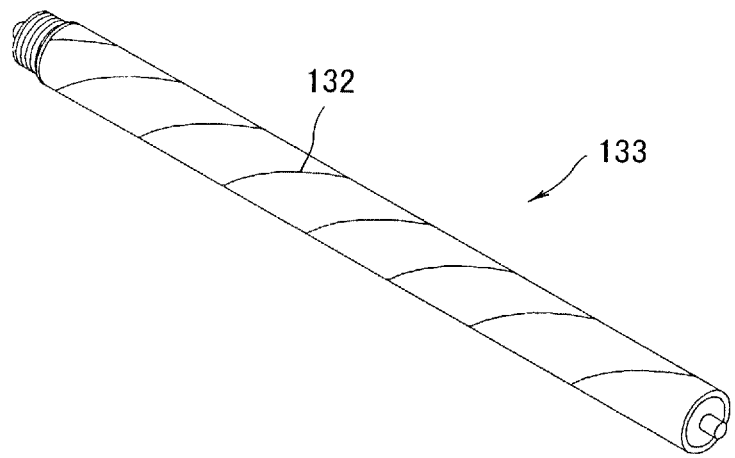
FIG. 17 is a perspective view of a braking roller employed in a transfer device in an embodiment further modified from those in FIGS. 1 and 16.

In the above-mentioned embodiment, the braking rollers 28 each are formed by the roller body 31 around which the high-frictional member 32 is attached, but a braking roller provided in the transfer device in the present invention is not limited thereto. It is possible, for example, to appropriately perform processing such as formation of concavity and/or convexity (for example, formation of a number of eminences or protrusions, grooves, or ridges) around the body 31 so as to increase a frictional force without the high-frictional member 32, and the resulting may be employed as a brake. Alternatively, the high-frictional member 32 may be formed with concavity and/or convexity on its surface. As shown in FIG. 16, for example, there may be provided a braking roller 131 with a plurality of eminences or protrusions 130 on an outer peripheral surface of the high-frictional member 32. As shown in FIG. 17, there may be also provided a braking roller 133 with a helical flute 132 extending in a longitudinal direction of the roller on the outer peripheral surface of the high-frictional member 32. Shortly, it is only necessary to act a strong frictional force between an article and the roller in a predetermined direction when the article is placed on the outer peripheral surface of the braking rollers.

Figure 18:
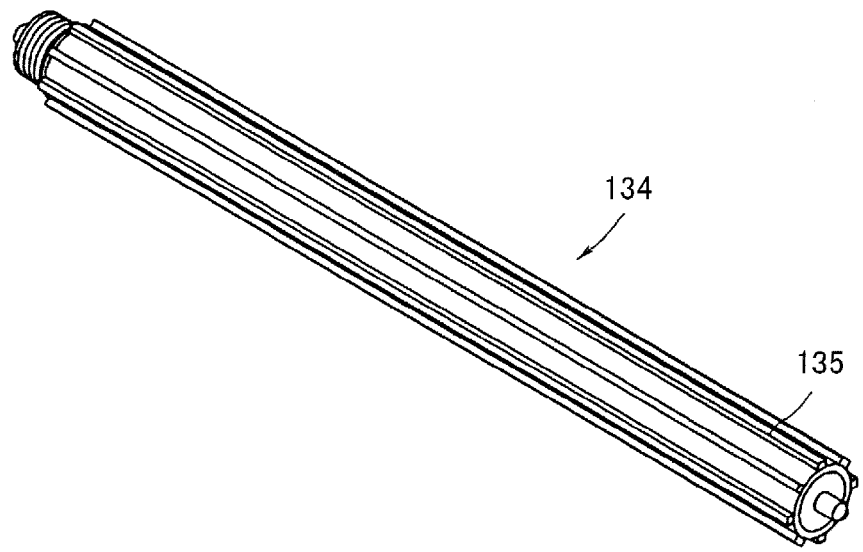
FIG. 18 is a perspective view of a modified braking roller.
Figure 19:
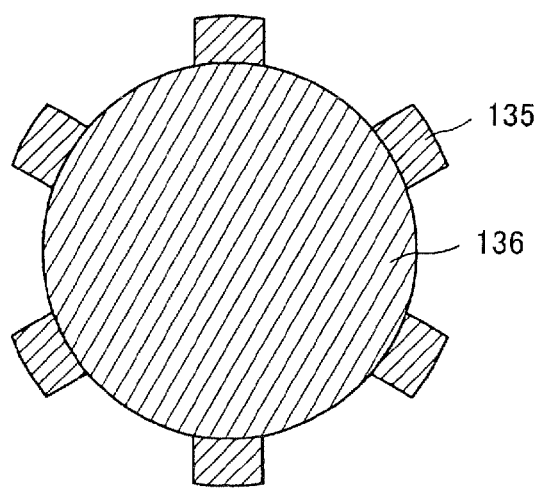
FIG. 19 is a cross section of the braking roller in FIG. 18.

Further, it is also possible to form ridges 135 extending in an axial direction, as shown in a braking roller 134 in FIG. 18. Preferably, a plurality of ridges 135 are, as shown in FIG. 19, formed around a roller body 136 at regular intervals.

Figure 20:
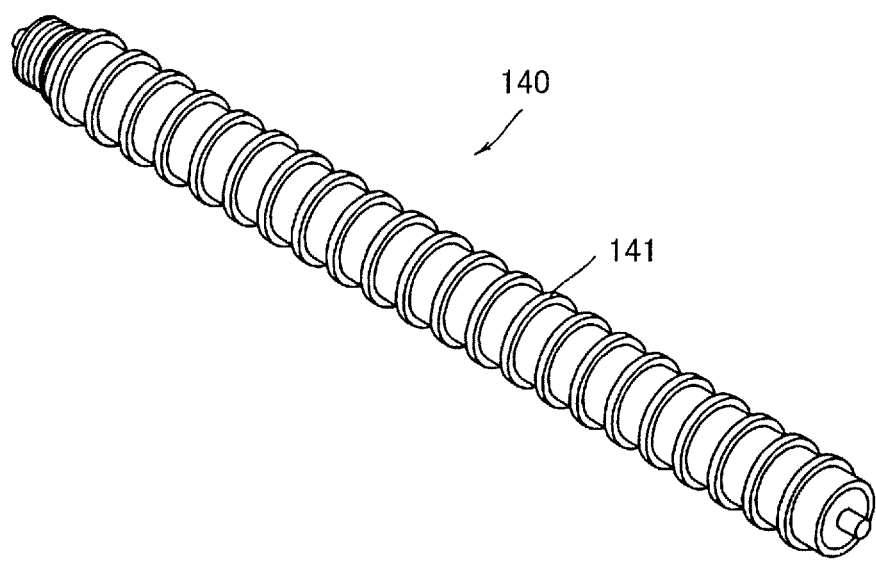
FIG. 20 is a perspective view of a further modified braking roller.

It is also possible to form ridges 141 circularly around the roller body 136, as shown in a braking roller 140 in FIG. 20. It is also possible to form helical ridges (not shown).

A method of providing the high-frictional member (a brake) 32 around the roller body 31 is discretionarily selected. The roller body 31 may be impregnated or applied with latex or other liquid resin, which is then hardened, for example.

Alternatively, a sheet of rubber or resin may be wrapped around the roller body 31. It is also possible to previously form a tube made of rubber or resin, in which tube the roller body 31 may be inserted.

BRIEF DESCRIPTION OF NUMERALS 1. transfer device
2. main conveyor part
3. subsidiary conveyor part
4. stopper (conveyance preventer)
10. first conveying surface
11. belt driving roller (rotation member)
12. belt (linear member)
13. belt driven roller (rotation member)
15. support
26. article to be conveyed
28. braking roller (roller)
29. frame (roller-side frame)
31. roller body
32. high-frictional member (brake)
45. switching roller
46. horizontally-moving member
47. output member
145. second conveying surface

The invention claimed is:

1. A transfer device comprising:
a main conveyor part having a first conveying surface; and
a subsidiary conveyor part having a second conveying surface and arranged at the same area as the main conveyor part,
the main conveyor part being designed to convey an article placed on the first conveying surface in one conveying direction,
the subsidiary conveyor part being designed to convey an article placed on the second conveying surface in another direction transverse to the conveying direction of the main conveyor part,
the subsidiary conveyor part being a roller conveyor having rollers, at least one of the rollers being a braking roller equipped with a brake comprising a surface that is configured to generate frictional forces against the article conveyed from the main conveyor part to the subsidiary conveyor part sufficient to cause the article to significantly decelerate as the article is conveyed from the main conveyor part to the subsidiary conveyor part and is engaged by the at least one roller, and
the brake being designed to prevent the article from proceeding at least to the direction transverse to the conveying direction of the roller conveyor by a braking force acting between the article and the braking roller.

2. The transfer device as defined in claim 1,
the braking roller having a thrust direction being the same or substantially the same as a direction of the article being carried in the roller conveyor.

3. The transfer device as defined in claim 1,
the braking roller being formed by a roller body covered with a high-frictional member having a high frictional coefficient.

4. The transfer device as defined in claim 1,
the braking roller being formed with at least one selected from a group consisting of concavity and convexity on an outer peripheral surface of the braking roller.

5. The transfer device as defined in claim 1,
the braking roller being formed by a roller body covered with a high-frictional member having a high frictional coefficient, the high-frictional member being further formed with at least one of a group consisting of concavity and convexity on a surface thereof.

6. The transfer device as defined in claim 1,
the braking roller being formed by a roller body covered with either rubber or resin.

7. The transfer device as defined in claim 1 further comprising a lift for lifting up and down at least one selected from the group consisting of the main conveyor part and the subsidiary conveyor part.

8. The transfer device as defined in claim 7,
forming a part of a conveyor, so as to convey the article to a direction along a main conveying path of the conveyor by the main conveyor part in the transfer device,
and
wherein, when the subsidiary conveyor part is to make the article to diverge from the main conveying path, the braking roller is moved to a level where an outer peripheral surface of the roller is higher than the first conveying surface of the main conveyor part before the article has reached the transfer device.

9. The transfer device as defined in claim 8,
wherein the subsidiary conveyor part is actuated after the article has substantially stopped with respect to a direction along the main conveying path so as to add a force in a direction transverse to the direction along the main conveying path onto the article, so that the article diverges from the main conveying path.

10. The transfer device as defined in claim 7,
forming a part of a conveyor, so as to convey the article to a direction along a main conveying path of the conveyor by the main conveyor part in the transfer device,
and
wherein, when the article to diverge from the main conveying path of the conveyor has either approached or reached the transfer device, the second conveying surface of the subsidiary conveyor part is moved to a level higher than that of the first conveying surface of the main conveyor part.

11. The transfer device as defined in claim 10,
wherein the subsidiary conveyor part is actuated while the article is moving to the direction along the main conveying path through inertia so as to add a force onto the article in a direction transverse to the inertia, so that the article diverges from the main conveying path.

12. The transfer device as defined in claim 7,
the lift comprising a horizontally-moving member designed to perform a horizontal movement and a switch designed to switch the horizontal movement to a lifting movement.

13. The transfer device as defined in claim 12,
the lift further comprising a switching roller provided with a motor and an output member designed to be rotated by the motor, so that the horizontally-moving member moves horizontally upon power transmission from the output member of the switching roller.

14. The transfer device as defined in claim 12,
the lift being positioned outside the main conveyor part and the subsidiary conveyor part.

15. The transfer device as defined in claim 12,
the main conveyor part being formed by at least one rotation member with a linear member spanned around and a support for supporting the rotation member and the linear member,
the subsidiary conveyor part including a frame for supporting the rollers,
wherein the linear member is partly or entirely arranged between the rollers of the roller conveyor.

16. The transfer device as defined in claim 15,
the lift having a support lifting portion for switching the horizontal movement of the horizontally-moving member to the lifting movement so as to lift up and down the support.

17. The transfer device as defined in claim 15,
the lift having a frame lifting portion for switching the horizontal movement of the horizontally-moving member to the lifting movement so as to lift up and down the frame.

18. The transfer device as defined in claim 15,
being designed to alternately lift up and down the frame and the support in accordance with the horizontal movement of the horizontally-moving member.

19. The transfer device as defined in claim 1,
further comprising a conveyance preventer for preventing the article from proceeding.

20. A transfer device, comprising:
a main conveyor part having a first conveying surface;
a subsidiary conveyor part having a second conveying surface and arranged at the same area as the main conveyor part;
a conveyance preventer for preventing the article from proceeding; and
a lift for lifting up and down the main conveyor part and the subsidiary conveyor part,
the main conveyor part being designed to convey an article placed on the first conveying surface in one conveying direction,
the subsidiary conveyor part being designed to convey an article placed on the second conveying surface in another direction transverse to the conveying direction of the main conveyor part,
wherein the main conveyor part is formed by at least one rotation member with a linear member spanned around and a support for supporting the rotation member and the linear member,
wherein the subsidiary conveyor part is a roller conveyor formed by a plurality of rollers and a frame for supporting the rollers, the rollers including at least one roller covered with either rubber or resin, and
wherein the lift includes a horizontally-moving member designed to perform a horizontal movement, and
the transfer device further comprising a support lifting portion for switching the horizontal movement of the horizontally-moving member to the lifting movement so as to lift up and down the support, a frame lifting portion for switching the horizontal movement of the horizontally-moving member to the lifting movement so as to lift up and down the frame, and a conveyance preventer-lifting portion for switching the horizontal movement of the horizontally-moving member to the lifting movement so as to lift up and down the conveyance preventer, so as to alternately lift up and down the frame and the support in accordance with the horizontal movement of the horizontally-moving member, and simultaneously to lift up the conveyance preventer when one selected from a group consisting of the frame and the support is lifted up and to lift down the conveyance preventer when the other selected from the group is lifted up.

* * * * *